Figure 1:
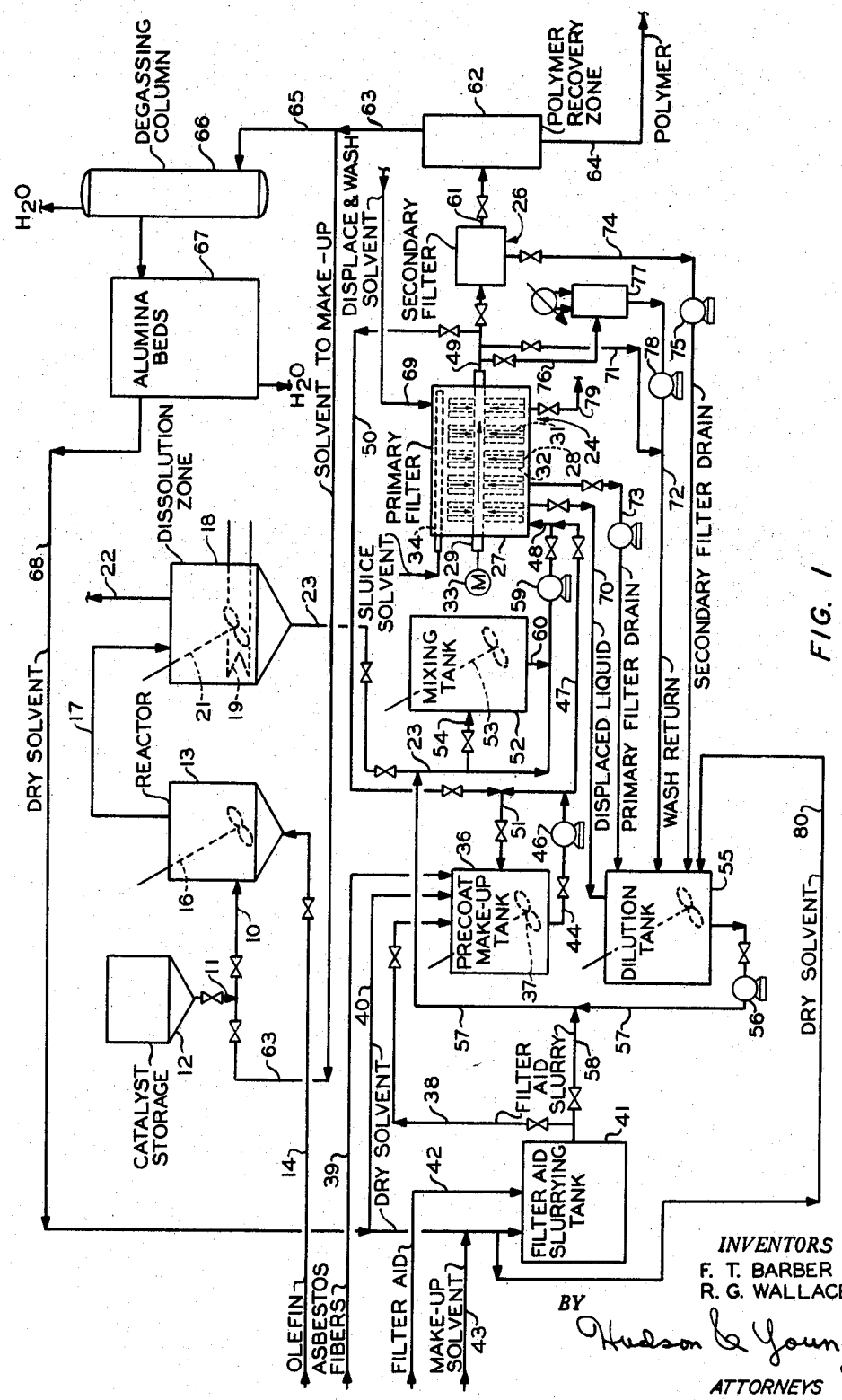

INVENTORS.
F. T. BARBER
R. G. WALLACE
BY Hudson & Young
ATTORNEYS

United States Patent Office 3,200,105
Patented Aug. 10, 1965

3,200,105
FILTER AID CONDITIONING
Franklin T. Barber, Bartlesville, Okla., and Robert G. Wallace, Pasadena, Tex., assignors to Phillips Petroleum Company, a corporation of Delaware
Filed Aug. 8, 1960, Ser. No. 47,975
8 Claims. (Cl. 260—94.9)

This invention relates to the removal of solids from polymer solutions by a filtration system. In one aspect it relates to a process for improving the separation of suspended solid catalysts from polymer solutions. In another aspect it relates to a method of building and maintaining a good precoat on the filters of the filtration system for removal of solids from polymer solution.

In the removal of solids from polymer solutions, various filtration means are used in well established unit operations for the separation of solutes from their solids. In some applications, the filter zone is prepared by the build up of a precoat material on the filter cloth. Uniform thickness and holding power by the filter cloth of the precoat is quite important for good filtration. The preliminary, but fundamental, step of preparing a satisfactroy precoat is also subject to many complications.

One particularly troublesome difficulty exists because of unavoidable water content in the filter aid hydrocarbon slurry. There is a tendency of the filter aid slurry, whether being used to precoat, or during the filtration operation itself, to agglomerate on the filter cloth in the primary filter zone. Agglomeration results in an uneven precoat which substantially increases the susceptibility of the precoat to breakthrough by the catalysts, due to inadequate coating in spots.

Moreover, there is a marked tendency for the precoat to fall off the filter cloth when any significant variations in the filter throughput rate are experienced. This precoat failure destroys, of course, the filtration function completely, and the filters must undergo the time consuming procedure of building up a new precoat, during which time the filtration unit cannot perform its solids removal function.

We have discovered that the difficulties of building and maintaining a filter precoat can be overcome by careful control of the water content of the filter aid-hydrocarbon slurry which goes to form the precoat. The filter aid, most usually a commercially available mineral, such as diatomaceous earth, is commercially supplied with a water content ranging between 210–300 parts per million. It is not practical to further calcine this mineral, as supplied, to reduce water content to within more acceptable limits. Furthermore, the diatomaceous earth comprises only a few weight percent of the hydrocarbon solvent when converted to slurry form for deposition on the filters.

In the prior art, it has been the practice to use recycle solvent, with a water content usually above 55 parts per million from the polymer recovery zone, combined with fresh make-up solvent, to slurry the filter aid. The water content of the blended solvent, added to that which is already in the filter aid itself, and assuming a ratio of solvent to filter aid of about 9 to 1, results in a filter aid slurry having a water content consistently exceeding 50 parts per million. We have established that when the water content of the filter aid slurry reaches even 38 parts per million, then relative filter throughput begins to fall below the optimum operating level. This is because of filter aid agglomeration on the filter cloth, and resultant catalyst breakthrough.

According to our invention, if only relatively dry hydrocarbon solvent is used to first thoroughly wet the filter aid, then subsequent water wetting thereof will be strictly limited. It is postulated that if the filter aid particles are selectively wetted with relatively dry solvent, they will not be as susceptible to agglomeration as those particles partially wetted by water present in a blend solvent. In any case, in this invention, a certain amount of dissolved water that comes from the polymer solution stream, which is most conveniently diluted with recycled wet solvent, can be tolerated. Thus, if the concentration of water in the fresh hydrocarbon solvent used for making the filter aid slurry, is held below 5 p.p.m., then in the dissolution of the filter aid with the fresh solvent, the resulting slurry will have a water content less than 40 p.p.m. Such a slurry has been demonstrated to produce a good filter precoat. Moreover, the tendency towards removal of a good precoat by a water-wetted filter feed will be controlled more satisfactorily, provided there is continuous removal of water from the recycled solvent.

It is, therefore, an object of this invention to provide an improved process for removing solids from polymer solutions in a filtration system.

Another object of the invention is to provide a method of building and maintaining a good precoat on the filter cloth in the filtration system.

A further object of the invention is to provide a precoat on a filter which is more uniform and less susceptible to solids breakthrough and precoat drop off due to fluctuations in flow throughput.

As indicated hereinbefore, the present invention is applicable to the separation of solid materials for polymer solutions in general. However, the invention is particularly applicable to the separation of suspended catalysts from solutions of polymers obtained according to the copending U.S. Patent application of G. E. Hanson and W. L. Stalder, Serial No. 606,427, filed August 27, 1956, now abandoned. As set forth in this application in more detail, a novel filtration system for use in the removal of solids from polymer solutions has been provided.

A satisfactory method of conducting the polymerization comprises contacting an olefin with a slurry of catalysts in a hydrocarbon solvent which can exist as a liquid at the temperature of polymerization. In such a case, the reaction pressure need only be sufficient to maintain the solvent substantially in the liquid phase and will ordinarily range from about 100–700 p.s.i. When a polymerization is carried out in this manner, the reaction effluent, which comprises a mixture of solvent and polymer, also contains finely divided suspended catalysts. A method for separating the catalysts from the reaction effluent is necessary if a polymer product of an acceptable ash content is to be produced.

Suitable solvents for use in the above-described process are hydrocarbons which are liquid and chemically inert under the reaction conditions. Solvents which can be advantageously used include paraffins, such as those having from 3 to 12, preferably from 7 to 9, carbon atoms per molecule, for example, 2,2,4-trimethylpentane (isooctane), normal hexane, normal decane, isopentane, and the like. Another class of solvents which can be used are naphthenic hydrocarbons having from 5 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. The described class of naphthenic hydrocarbons includes condensed ring compounds such as Decalin and the alkyl derivatives thereof. A preferred subclass of naphthenic hydrocarbons within the above-defined class is constituted by those naphthenic hydrocarbons having from 5 to 6 carbon atoms in a single ring and from 0 to 2 methyl groups as the only substituents on the ring. Thus, the preferred naphthenic hydrocarbon solvents are cyclopentane, cyclohexane, methylcyclopentane, methylcyclohexane, the dimethylcyclopentanes, and the dimethylcyclohexanes.

For precoating the filters, any of several commercially available filter aids may be employed, for example: asbestos, diatomaceous earth, perlite, activated carbon, or colloidal clays. These filter media may be applied to the filter screens as a precoat either alone or in any combination, depending upon the service conditions. We have found diatomaceous earth combined with asbestos fibers to be preferred in this process.

Figure 2:
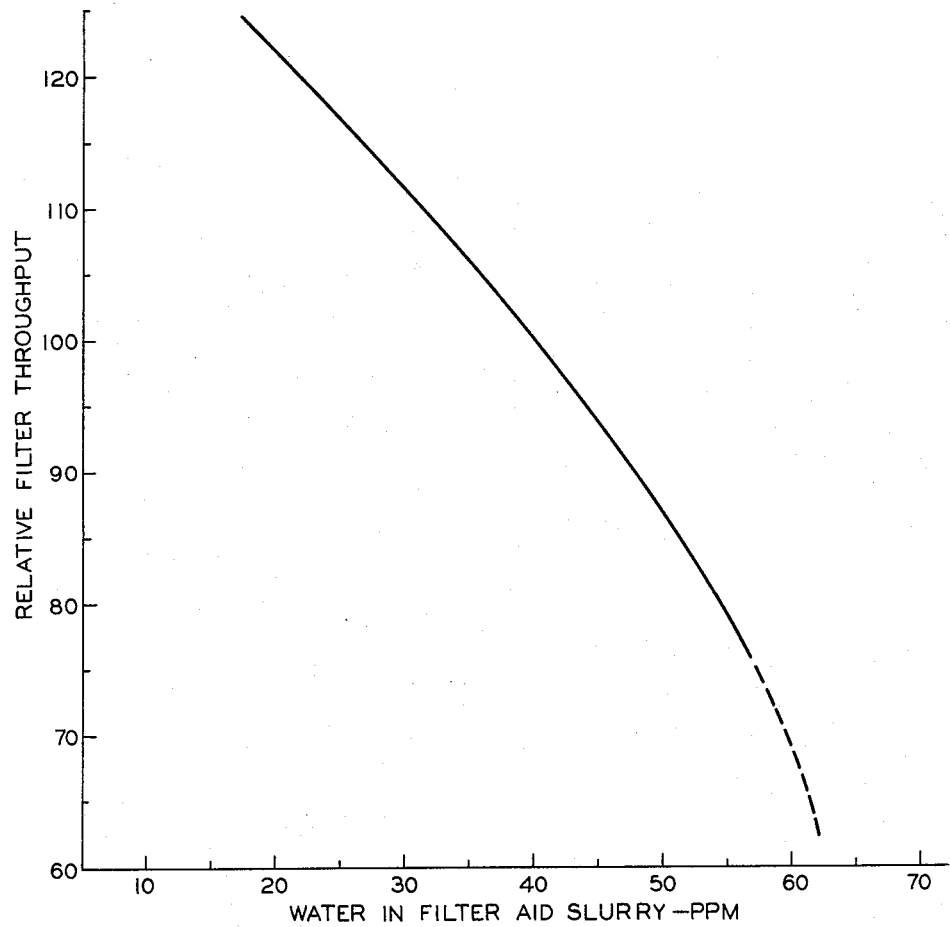

A more complete understanding of the invention may be obtained by reference to the drawing, in which:

FIGURE 1 is a flow diagram illustrating a polymer preparation and recovery system embodying the improved filtration system of this invention, and FIGURE 2 is a plot showing the variation in relative filter throughput with water in the filter aid slurry.

While the invention will be discussed with relation to the polymerization of ethylene using cyclohexane as the solvent, it is to be understood that it is not intended to limit the invention to any particular polymerization process. As previously indicated, the invention is broadly applicable to the improved separation of solid materials from solutions of polymer in any suitable solvent.

As shown in the drawing, a suitable solvent, such as cyclohexane, enters the system through inlet line 10. A catalyst, which preferably has a particle size in the range of about 40 to about 100 mesh, is added to the solvent by means of line 11 connecting catalyst storage tank 12 to line 10. The slurry of catalyst in solvent which is thus formed is then pumped into reactor 13. The catalyst can be, for example, a chromium oxide-silica-alumina catalyst prepared by: impregnating a 90 weight percent silica and 10 weight percent alumina gel composition with chromium trioxide, drying, and heating in air to obtain a catalyst composition containing approximately 2.5 weight percent chromium in the form of chromium oxide of which approximately half is or has, during one step of the activation stage, been in the form of hexavalent chromium.

An olefin, such as ethylene, enters the system through inlet line 14 and is intimately contacted with the catalyst slurry in reactor 13. A suitable stirring means 16, driven by a motor (not shown), is provided to facilitate contacting and to maintain the catalyst in suspension in reaction mixture. The reaction zone can be maintained, for example, at 275° F., and 500 p.s.i., with the reaction time ranging from about 15 minutes to about 10 hours. The reactor effluent, which is withdrawn through line 17, comprises a mixture of polymer, solvent, suspended catalyst, and a small amount of unreacted ethylene. The catalyst particles generally range in size from 0.3 to 100 microns, with from 60 to 80 percent of them being less than 10 microns in size. Additional solvent can be added to line 17 or to dissolution zone 18, if desired, in order to obtain a mixture having a suitable viscosity for transfer through the system. The concentration of polymer is ordinarily adjusted to a value in the range from about 1 to about 15 weight percent, based on polymer plus solvent. The resulting mixture is passed into dissolution zone 18 wherein the mixture is heated by a heating means, such as heating coil 19, and agitated by means of stirring means 21 to insure complete solution of polymer in the solvent. The dissolution zone is generally maintained at a temperature from 25 to 50° F. higher than reactor 13, a suitable temperature ordinarily being approximately 300 to 325° F. The pressure in dissolution zone 18 is ordinarily lower than that in reactor 13, for example, about 75 to 300 p.s.i. lower, but still high enough to maintain the solvent in liquid phase. The increased temperature and the reduced pressure can be utilized to remove any unreacted ethylene or other gas, which can be withdrawn through outlet line 22. The resulting solution, containing suspended catalyst, which is removed from dissolution zone 18 by means of line 23, is thereafter passed through the improved filtration system of this invention to remove the catalyst.

The filtration system comprises a primary filter 24 and a secondary filter 26 arranged in series as shown. A centrifuge or other solids separating device (not shown) may be used upstream to the primary filter to reduce the filtration load. The primary filter is a batch-type precoat filter, such as a Vallez-type filter while the secondary filter is a cartridge-type filter, such as a Sparkler filter. The primary filter, as illustrated, comprises a closed shell 27 having various outlets and inlets connected thereto as will be discussed more in detail hereinafter. A plurality of filter discs or leaves 28 are assembled at regular spaced intervals upon a hollow rotatable shaft 29 through which the filtrate is removed. The hollow shaft is supported on bearings (not shown) at either end of shell 27 and is operatively connected to a motor 33. The filter discs each comprise a filter screen 31 upon which the precoat material 32 is formed during the precoating operation. During the operation of the filter, the filter discs may or may not rotate within shell 27, the liquid therein passing into the interior of the filter disc and thence into hollow shaft 29 for removal from the filter. In an upper portion of shell 27 above the filter discs there is positioned a sluice pipe 34 which is provided with a series of holes drilled so that jets of liquid will impinge against each side of the filter discs. The secondary filter is a cartridge-type filter and comprises a cartridge assembly which can be readily removed for replacement of the filter medium, such as a suitable filter paper.

The primary filter 24, prior to introduction of filter feed thereinto, is prepared for the filtering operation by coating the filter screens 31 of the filter discs with a precoat material 32, made up of a slurry of a filter aid, such as diatomaceous earth, in a hydrocarbon, such as cyclohexane, which may be supplemented by asbestos fibers. The precoat material is supplied to filter 24 in the form of a slurry which is prepared in precoat make-up tank 36, provided with a suitable stirring means 37. The precoat make-up material is introduced into the precoat tank 36 through line 38 as a slurry in a suitable hydrocarbon, preferably the same hydrocarbon solvent utilized in the polymerization process. Precoat tank 36 is further provided with a conduit 39 for supply of asbestos fibers to the filter aid slurry therein. Asbestos fibers in the precoat material aid in the prevention of plugging of filter screens and the obtaining of improved filtrate clarity with increased throughput, additional filter cake capacity and faster sluicing. Tank 36 is also provided with a conduit 40 for supplying dry solvent in order to dilute the precoat material to perhaps no more than 1 or 2 percent by weight of the final precoat slurry, as desired.

A filter aid slurrying tank 41 is located upstream of precoat tank 36. Slurrying tank 41 is provided with an inlet conduit 42 for supplying a commercially available filter aid, such as diatomaceous earth, thereto. Tank 41 is also provided with a hydrocarbon solvent feed line 43, through which solvent having a water content on higher than 5 parts per million, and preferably between 0.5 and 2 parts per million, is supplied thereto. Flter aid, which has been wetted and slurried with this relatively dry solvent, passes from tank 41 via conduit 44 to precoat make-up tank 36.

The filter aid slurry entering the precoat make-up tank through line 38 generally contains from about 10 to about 15 weight percent of filter aid. Asbestos fibers as indicated, are added to the precoat make-up tank 36 through conduit 39. Dry recycle solvent is added through line 40 to give a final slurry generally containing from about 1 to about 5 weight percent precoat material. The resulting precoat slurry is removed from precoat tank 36 through line 44 and then pumped by means of pump 46 through lines 47 or 48 into the lower portion of primary filter 24.

The precoat slurry is supplied to the primary filter until a predetermined amount of precoat material is deposited on the filter screens, generally from about 0.1 to about 1.0 pound of precoat material per square foot of filter surface area. Precoating operation is ordinarily carried out with a precoat slurry at a temperature in the range of about 200–400° F., preferably at about 300° F., and at a pressure of about 85–150 p.s.i. in the primary filter. The filtrate, substantially free of precoat material, is withdrawn from the primary filter through line 49 and then recycled through lines 50 and 51 to precoat make-up tank 36.

After the precoating operation is completed, the cycling of precoat slurry to the primary filter is terminated, and the filter feed is then charged to the filter zone. The filter feed is prepared in mixing tank 52, which is provided with a suitable stirring means 53. The polymer solution, containing suspended catalysts, is removed from dissolution vessel 18 through line 23, as described hereinbefore, and passed into mixing tank 52 through line 54. A stream comprising solvent, which is pumped from dilution tank 55 by means of pump 56, is also added to mixing tank 52 through lines 57, 23 and 54. A slurry of filter aid, such as diatomaceous earth in cyclohexane, is added to stream 57 through line 58. The quantity of filter aid added will generally be from 1 to 15 pounds of filter aid per pound of catalyst. In mixing tank 52, the filter feed is maintained at a temperature sufficient to maintain the polymer in solution, for example, at about 300° F. and at a pressure sufficient to maintain the solvent in the liquid phase, for example, between 80–150 p.s.i. and higher. The pressure in mixing tank 52 is generally about equal to the pressure in dissolution zone 18, except for the pressure drop in the connecting lines. Pressure in primary filter 24 is ordinarily about equal to the pressure in mixing tank 52, plus the pressure developed by pump 59. The filter feed removed from the bottom of the mixing tank through line 60 is then pumped by means of pump 59 into the lower portion of primary filter 24 through line 48.

As previously described, filter discs 28, covered with precoat material, rotate within the primary filter, which is maintained liquid full. A filtrate comprising polymer solution flows through the precoat material and the screens of the filter discs, and thence into hollow shaft 29. During this operation, catalysts particles are separated from the filter feed, and filter aid is deposited on the precoat material. The polymer solution, substantially free of suspended catalysts, which is recovered from the primary filter through line 49 connected to hollow shaft 29, is then introduced into secondary filter 26. In the secondary filter, the solution is passed through a filter medium, such as filter paper, so as to remove additional catalysts from the solution. Polymer solution having a desired low ash content, for example, 0.0006 weight percent ash or less, is withdrawn from the secondary filter through line 61 and then passed to polymer recovery zone 62.

Polymer recovery zone 62 can be any suitable means for recovering polymer from a solution thereof in a solvent, and can comprise, for example, a series of evaporation steps as described in more detail in the U.S. Patent of M. R. Cines 2,849,429 issued August 26, 1958. The zone can also comprise cooling and filtration equipment (not shown), whereby the dissolved polymer is precipitated from solution by cooling the solvent to a temperature below the lower cloud point and subsequently filtering. Solvent recovered from zone 62 through line 63 can be recycled to reactor feed line 10. The polymer product is recovered from zone 62 through line 64.

Simultaneously, a part of the recycling solvent in line 63 can be passed via by-pass line 65 to a water separation zone, comprising degassing column 66 and/or alumina beds 67. Sufficient water is removed from this portion of the solvent stream to reduce the water content thereof to less than 5 parts per million. The substantially dewaterized solvent is then passed via conduit 68 to filter aid slurrying tank 41, in conjunction with, or as an alternative to, the supplying of fresh make-up solvent via conduit 43.

The supply of feed to the primary filter is terminated when the pressure drop across the filter reaches a preselected value. It has been found that this pressure drop is generally in the range of about 20 to 40 p.s.i., preferably about 30 p.s.i. While in the system shown in the drawing only one primary filter is illustrated, it is within the scope of the invention to use two or more primary filters in parallel so that one filter can be operating on the precoating operation cycle while another filter is on the filtration cycle. Since the secondary filter can be operated by several days without changing the filter medium, and since the cycle length of the primary filter is usually of the order of a few hours, it is seen that one secondary filter can service several primary filters.

After termination of supply of filter feed to the primary filter, a hydrocarbon solvent, in this case cyclohexane, is introduced into the upper portion of shell 27 through line 69. The cyclohexane introduced into the primary filter through line 69 displaces the liquid material contained in the filter. Displaced liquid is withdrawn from the bottom of the filter through line 70 and then introduced into dilution tank 55. A portion of the displaced liquid is removed from the filter through the filter discs in order to hold the cake on the discs, and is then passed into the dilution tank through lines 71 and 72. It is also within the scope of the invention to displace the liquid through the filter discs and thence through the secondary filter into the polymer recovery zone for recovery of any polymer contained therein. After displacement of the liquid from the primary filter is completed, the supply of cyclohexane to the filter through line 69 is continued, the cyclohexane in this case serving as a wash liquid. The wash liquid flows through the filter discs and the hollow shaft of the filter, removing any polymer solution which may be present. After withdrawal from the primary filter through line 49, the wash liquid is passed into dilution tank 55 through line 71.

Upon completion of the washing operation which is continued for a time sufficient to remove any polymer solution contained in the primary filter, the filter is drained of the liquid material contained therein. At the time when the secondary filter is to be cleaned, it also is drained of the liquid material which it contains. The liquid material comprising primarily solvent drained from the primary filter is recovered through line 73 while line 74 provides means for draining the secondary filter. The liquid drained from the filters through these lines is pumped by means of pumps 75 into dilution tank 55. During the drainage of the primary filter, a portion of the solvent contained in the liquid material evaporates and passes through the filter discs and thence out of the filter through line 49. Because of the evaporation of the solvent and its removal through the filter medium, the filter cake comprising precoat material, filter aid and catalyst is caused to remain on the screens of the filter disc during the drainage operation. The evaporated solvent recovered from the filter through line 49 is passed by means of line 76 into vapor receiver and condenser 77 wherein the solvent vapors are condensed. The condensed liquid recovered from the bottom of the vapor receiver and condenser is pumped through line 72 into dilution tank 55 by means of pump 78.

After drainage of the primary filter is completed, a sluice solvent, in this case cyclohexane, is introduced into the upper portion of the primary filter through perforated pipe 34. The cyclohexane leaves pipe 34 in a series of jets which impinge against either side of each of the filter discs. The impinging streams of cyclohexane loosen the filter cake deposited on the screens of the filter discs, causing it to fall into the bottom of the primary filter. The slurry of filter cake in cyclohexane, which is recovered from the bottom of the primary filter through line 79, is then passed to a suitable system for recovery of the cyclohexane and filter cake. The filter cake can then be treated to separate catalyst therefrom; and the resulting precoat material reused in the system. After the filter cake and solvent have been removed from the primary filter, the filter is then in condition for the precoating operation as described hereinabove.

It will be noted from the above description that the displaced liquid, the wash liquid and the drained material are all introduced into dilution tank 55. This tank is also provided with a line 80, whereby a solvent can be introduced thereinto so as to provide a liquid therein having a desired viscosity. Line 80 is preferably supplied with substantially dry solvent from solvent recycle line 68 before it enters filter aid slurrying tank 41. Liquid material contained in the dilution tank 55 is subsequently recycled to mixing tank 52 through lines 57, 23 and 54. This stream also serves as the carrier for filter aid slurry introduced thereinto through line 57 as discussed hereinbefore.

A better understanding of the invention can be obtained by referring to the following illustrating example, which is not intended, however, to be unduly limitative of the invention.

EXAMPLE I

Three runs employing cyclohexane as solvent for slurrying the filter aid in tank 41 were undertaken. The cyclohexane varied in water content from greater than 5 parts per million to less than 1 part per million. A precoat was prepared on the filter medium in the primary filtration zone 24, as described hereinbefore. The results in terms of effectiveness of filtration are shown in Table I.

Table I

| Water content of cyclohexane feed (parts per million): | Filtration capacity of 558 ft.$^2$ of filter area |
|---|---|
| Greater than 5 | Precoat not acceptable for filtration, due to agglomeration. |
| 1–5 | 8,000–15,000 gallons per cycle. |
| Less than 1 | 30,000–40,000 gallons per cycle. |

EXAMPLE II

Another series of runs were made to determine variations in relative filter throughput as a function of water present in the filter aid slurry leaving filter aid slurrying tank 41. Water content of the dilution solvent added to tanks 41 and 55 was in the range 5 to 25 parts per million. The filter aid was taken as having an average water content of 270 parts per million. To achieve a 10 percent concentration of filter aid in solvent, the ratio of solvent to filter aid was 9 to 1. The variation in filter throughput was plotted as a function of slurry water content, which was calculated as follows in Table II.

Table II

| Run | Filter Aid (H$_2$O Content, p.p.m.) | Dilution Solvent (H$_2$O Content, p.p.m.) | Filter Aid Slurry (H$_2$O Content, p.p.m.) |
|---|---|---|---|
| 1 | 270 | 2.2 | 29.0 |
| 2 | 270 | 5.5 | 32.0 |
| 3 | 270 | 16.7 | 42.0 |
| 4 | 270 | 23.3 | 48.0 |
| 5 | 270 | 37.7 | 60.0 |

It will be seen, when the above data are plotted as in FIGURE 2, that the fall off in relative filter throughout is steep as water content in the slurry rises from about 29 to 60 parts per million. It appears that the optimum operating rate for the Vallez type filters used, is when water content is maintained below 40 parts per million. Thus, the present invention achieves this object by assuring that the dilution solvent is well below 10 parts per million in water content, and preferably between 1 and 5 parts per million.

It will be apparent to those skilled in the art that variations and modifications of the invention can be made from a study of the foregoing disclosure. Such variations and modifications are believed to be clearly within the spirit and scope of the invention.

We claim:

1. In a method for removing solids from a solution of a normally solid olefin palymer in a solvent which comprises introducing said solution containing suspended solids into a first filter zone; passing said solution through filter medium disposed within said first filter zone, said filter medium being coated with filter aid being selected from the group consisting of asbestos, diatomaceous earth, perlite, activated carbon, and colloidal clays, as a precoat material; and withdrawing said solution substantially free of said solids from said first filter zone; the improvement which comprises preparing said precoat material from hydrocarbon slurry of filter aid, said filter aid having a water content ranging between 210–300 p.p.m. and said hydrocarbon solvent being selected from the group consisting of paraffin hydrocarbons having from 3 to 12 carbon atoms per molecule, and naphthenic hydrocarbons having from 5 to 6 carbon atoms in a naphthenic ring and from 0 to 2 methyl groups as the only substituents on said ring, and having a water content ranging between 1–5 p.p.m. and the ratio of said filter aid to said hydrocarbon solvent is such that said resulting slurry has a water content below 40 p.p.m.

2. The method of claim 1 wherein said polymer is a polymer of ethylene, said solids include catalysts utilized to produce said ethylene polymer, and said solvent is a hydrocarbon.

3. The method of claim 1 wherein said filter medium disposed within said first filter zone is coated with diatomaceous earth.

4. The method of claim 2 wherein the hydrocarbon solvent is cyclohexane.

5. An improved method for removing solids from a solution of a normally solid olefin polymer in a hydrocarbon solvent which comprises preparing a hydrocarbon slurry of filter aid, said filter aid being selected from the group consisting of asbestos, diatomaceous earth, perlite, activated carbon, and colloidal clays, and having a water content ranging between 210–300 parts per million and said hydrocarbon solvent being selected from the group consisting of paraffin hydrocarbons having from 3 to 12 carbon atoms per molecule, and naphthenic hydrocarbons having from 5 to 6 carbon atoms in a naphthenic ring and from 0 to 2 methyl groups as the only substituents on said ring, and having a water content ranging between 1–5 parts per million and the ratio of said filter aid to said hydrocarbon solvent is such that said resulting slurry has a water content below 40 p.p.m., circulating said slurry through filter medium disposed within a first filter zone to form a precoat material thereon; introducing said solution containing suspended solids into said first filter zone; passing said solution through said filter medium disposed within said first filter zone, said filter medium being coated with said precoat material; withdrawing said solution substantially free of said solids from said first filter zone; introducing said withdraw solution into a second filter zone; passing said withdraw solution through a filter medium disposed within said second filter zone so as to remove additional solids from said solution; and withdrawing said solution with a desired low solids content from said second filter zone.

6. In a method for removing solids from solution of a normally solid olefin polymer in a solvent being selected from the group consisting of paraffin hydrocarbons having from 3 to 12 carbon atoms per molecule, and naphthenic hydrocarbons having from 5 to 6 carbon atoms in a naphthenic ring and from 0 to 2 methyl groups as the only substituents on said ring, which comprises introducing said solution containing suspended solids into a first filter zone; passing said solution through filter meduim disposed within said first filter zone, said filter medium being coated with filter aid being selected from the group consisting of asbestos, diatomaceous earth, perlite, activated carbon, and colloidal clays, as a precoat material; withdrawing said solutions substantially free of said from said first filter zone; introducing said withdrawn solution into a second filter zone, passing said withdrawn solution through filter medium disposed within said second filter zone so as to remove additional solids from said solution; withdrawing said solution with a desired low solids content from said second filter zone; introducing said solution withdrawn from said second filter zone into a polymer recovery zone; withdrawing solvent from said polymer recovery zone; and recycling said withdrawn solvent to said process; the improvement which comprises first treating at least a part of said recycled solvent in a water separation zone to reduce the water content thereof to less than 5 parts per million, and passing said dewaterized solvent to a zone wherein a slurry of said filter aid is prepared.

7. The method according to claim 6 wherein said water separation zone comprises a degassing column and alumina beds.

8. The method according to claim 6 wherein at least a part of said dewaterized solvent is passed to a dilution zone for drain material from said first and second filter zones.

References Cited by the Examiner
UNITED STATES PATENTS

| | | | |
|---|---|---|---|
| 2,040,818 | 5/36 | Badollet | 210—203 |
| 2,668,151 | 2/54 | Pedlow et al. | 252—428 |
| 2,702,288 | 2/55 | Hoeksema et al. | 260—94.9 |
| 2,849,429 | 8/58 | Cines | 260—88.1 |
| 2,963,469 | 12/60 | Cines | 260—94.9 |
| 3,031,438 | 4/62 | Hanson et al. | 260—94.9 |

OTHER REFERENCES

"Industrial Filtration" (Wright), published by the Chemical Catalog Company, Inc. (1923), (page 27 relied upon).

"Handbook of Filtration," published by The Eaton-Dikeman Company (1960), (pages 1–9 relied upon).

JOSEPH L. SCHOFER, *Primary Examiner.*

M. LIEBMAN, *Examiner.*

UNITED STATES PATENT OFFICE
CERTIFICATE OF CORRECTION

Patent No. 3,200,105 August 10, 1965

Franklin T. Barber et al.

It is hereby certified that error appears in the above numbered patent requiring correction and that the said Letters Patent should read as corrected below.

Column 8, line 8, for "palymer" read -- polymer --; column 9, line 4, after "said", second occurrence, insert -- solids --.

Signed and sealed this 15th day of March 1966.

EAL)

ttest:

RNEST W. SWIDER
:testing Officer

EDWARD J. BRENNER
Commissioner of Patents